United States Patent
Klein et al.

(10) Patent No.: US 9,369,448 B2
(45) Date of Patent: Jun. 14, 2016

(54) NETWORK SECURITY PARAMETER GENERATION AND DISTRIBUTION

(75) Inventors: Philippe Klein, Jerusalem (IL); Avi Kliger, Ramat Gan (IL)

(73) Assignee: BROADCOM CORPORATION, Irvine, CA (US)

( * ) Notice: Subject to any disclaimer, the term of this patent is extended or adjusted under 35 U.S.C. 154(b) by 835 days.

(21) Appl. No.: 13/170,979

(22) Filed: Jun. 28, 2011

(65) Prior Publication Data

US 2012/0311683 A1 Dec. 6, 2012

Related U.S. Application Data

(60) Provisional application No. 61/492,240, filed on Jun. 1, 2011.

(51) Int. Cl.
  *H04L 9/32* (2006.01)
  *H04L 29/06* (2006.01)
  *H04L 12/24* (2006.01)

(52) U.S. Cl.
  CPC ............... *H04L 63/06* (2013.01); *H04L 41/28* (2013.01); *H04L 63/20* (2013.01)

(58) Field of Classification Search
  None
  See application file for complete search history.

(56) References Cited

U.S. PATENT DOCUMENTS

| | | | | |
|---|---|---|---|---|
| 6,240,188 | B1 * | 5/2001 | Dondeti et al. | 380/284 |
| 6,892,230 | B1 * | 5/2005 | Gu et al. | 709/220 |
| 7,234,058 | B1 * | 6/2007 | Baugher et al. | 713/163 |
| 2005/0096048 | A1 * | 5/2005 | Clare et al. | 455/433 |
| 2006/0173978 | A1 * | 8/2006 | Palm et al. | 709/220 |
| 2007/0050615 | A1 * | 3/2007 | Xu et al. | 713/151 |
| 2007/0061575 | A1 * | 3/2007 | Bennett | 713/171 |
| 2007/0097878 | A1 * | 5/2007 | Morioka et al. | 370/254 |
| 2007/0211734 | A1 * | 9/2007 | Yang et al. | 370/401 |
| 2007/0226779 | A1 * | 9/2007 | Yokomitsu et al. | 726/2 |
| 2007/0254593 | A1 * | 11/2007 | Jollota et al. | 455/67.11 |
| 2007/0289025 | A1 * | 12/2007 | Tanaka et al. | 726/28 |
| 2008/0130640 | A1 * | 6/2008 | Hurwitz et al. | 370/389 |
| 2008/0178252 | A1 * | 7/2008 | Michaud | 726/1 |
| 2009/0227282 | A1 * | 9/2009 | Miyabayashi et al. | 455/552.1 |
| 2009/0296924 | A1 * | 12/2009 | Oksman et al. | 380/30 |
| 2010/0281249 | A1 | 11/2010 | Das et al. | |
| 2011/0107404 | A1 * | 5/2011 | Ramsdell et al. | 726/5 |
| 2011/0173435 | A1 * | 7/2011 | Liu et al. | 713/150 |
| 2012/0011578 | A1 * | 1/2012 | Hinton et al. | 726/8 |

OTHER PUBLICATIONS

Kaliski, PKCS #5: Password-Based Cryptography Specification Version 2.0, Sep. 2000, IETF Netwrk Working Group, RFC 2898, pp. 1-34.*
Gavette et al., HomePlug AV Technology Overview, 2006, Microsoft WinHEC, pp. 1-14.*
European Search Report for application 12003864.1-1853 /2530900 mailed Nov. 14, 2013.
"P1905.1TM/D05 Draft Standard for a Convergent Digital Home Network for Heterogeneous Technologies", May 5, 2012, IEEE, 81 pages.
King, et al., "Deliverable 6.2 Security Specifications", Jul. 8, 2009, ICT-213311, Omega, Seventh Framework Programme Theme 3 Information and Communication Technologies (ICT), 66 pages.

* cited by examiner

*Primary Examiner* — Jung Kim
*Assistant Examiner* — Adrian Stoica
(74) *Attorney, Agent, or Firm* — Foley & Ladner LLP

(57) ABSTRACT

Disclosed are various embodiments for facilitating network security parameter distribution and generation in a converged network incorporating multiple heterogeneous link layer networking technologies. Embodiments are provided for connecting network devices through multiple heterogeneous link layer networking technologies using a converged network password. Embodiments are provided for connecting network devices through multiple heterogeneous link layer networking technologies using a pairing event protocol, such as, for example, a push button protocol.

20 Claims, 13 Drawing Sheets

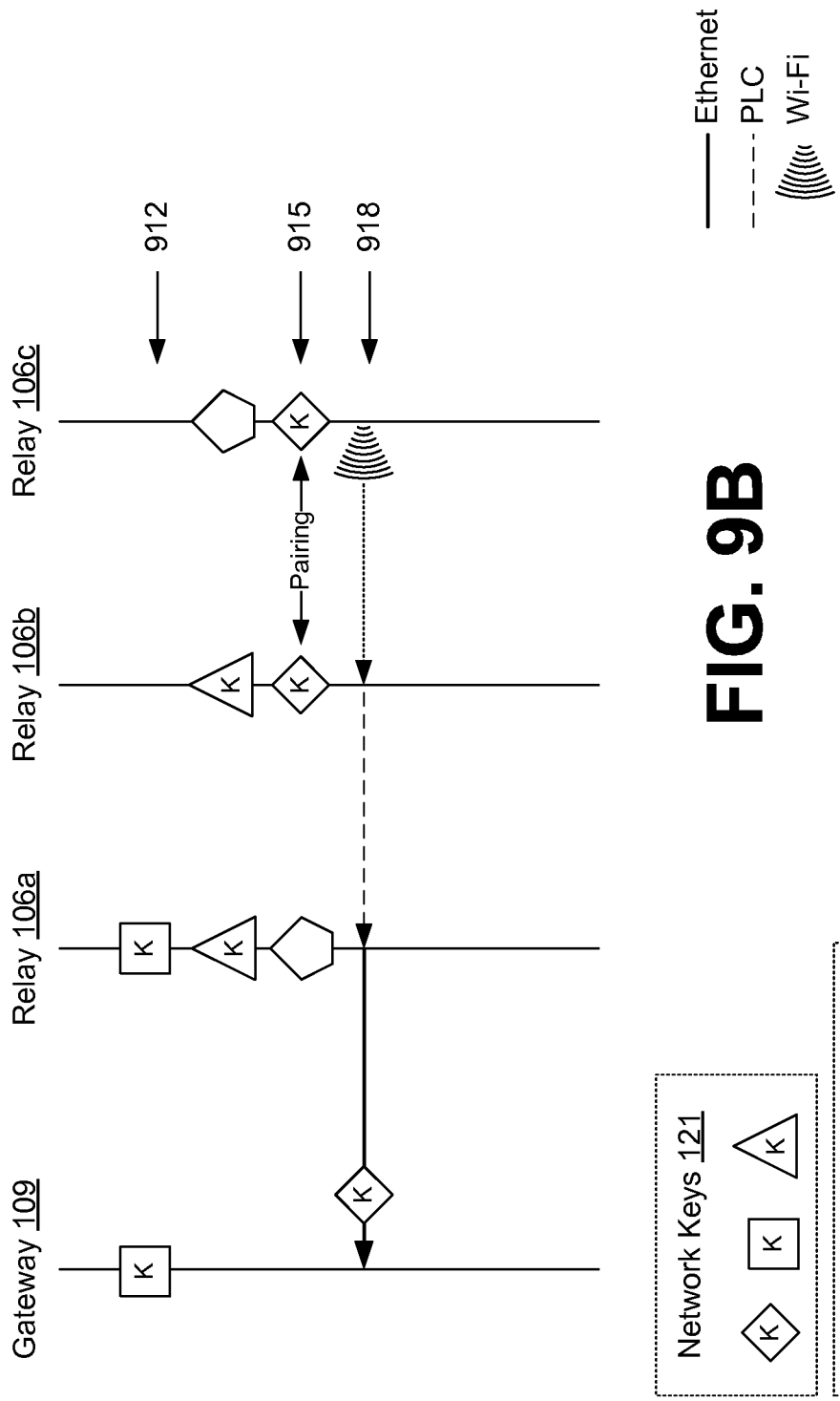

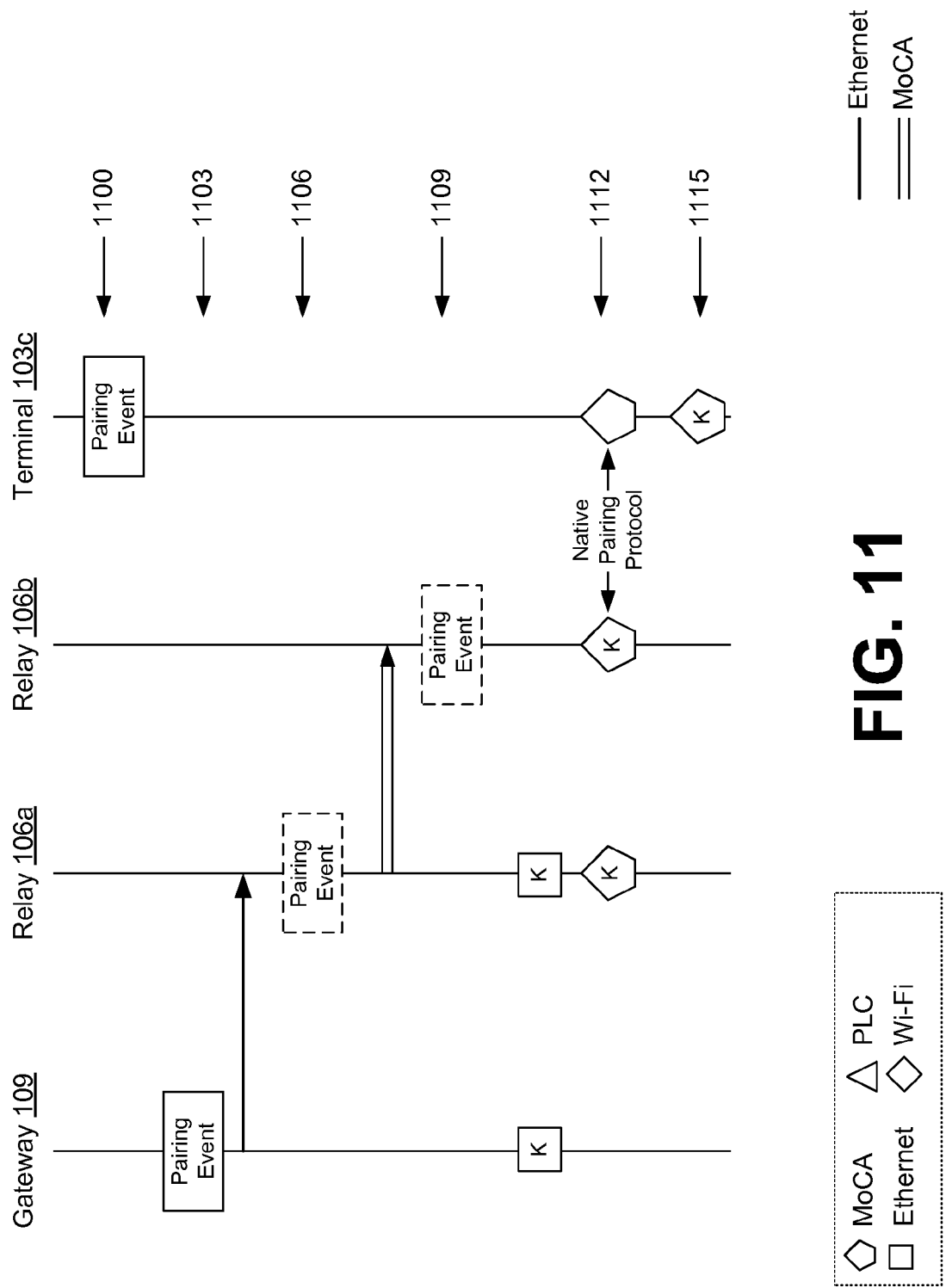

NETWORK SECURITY PARAMETER GENERATION AND DISTRIBUTION

CROSS-REFERENCE TO RELATED APPLICATION

This application claims priority to, and the benefit of, U.S. Provisional Patent Application entitled, "NETWORK SECURITY PARAMETER GENERATION AND DISTRIBUTION," having application No. 61/492,240, filed on Jun. 1, 2011, which is incorporated by reference in its entirety.

BACKGROUND

Many different types of technologies exist for home networking. Some homes have Category 5e or better unshielded twisted pair (UTP) cabling running to various locations, and Institute of Electrical and Electronics Engineers (IEEE) 802.3 Ethernet may be run over this type of cable. However, many homes may not be wired for Ethernet, and it may be cost prohibitive to add such wiring. IEEE 802.11 Wi-Fi is an alternative that allows for wireless home networking, but it may be susceptible to degraded performance due to interference, distance, line-of-sight obstructions, etc. HomePNA (HPNA) and Multimedia over Coax Alliance (MoCA) provide standards for networking over plain old telephone service (POTS) cable and coaxial cable, respectively, which may already be present in rooms for telephone and/or television service. Power line communication (PLC) standards, such as, e.g., IEEE 1901, HomePlug AV, etc., provide for networking over alternating current (AC) power wiring, which may be available at any power outlet. Due to the differing characteristics of the various networking technologies, a home is likely to employ multiple technologies.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 9A-9C are sequence diagrams illustrating network key distribution among network devices using centralized network key distribution by the gateway in the converged network of FIG. 1 according to various embodiments of the present disclosure.

FIG. 11 is a sequence diagram illustrating pairing among network devices relative to pairing events in the converged network of FIG. 1 according to various embodiments of the present disclosure.

DETAILED DESCRIPTION

The present disclosure relates to network security parameter generation and distribution in converged data communication networks employing multiple heterogeneous link layer technologies. Institute of Electrical and Electronics Engineers (IEEE) P1905.1 is one standard under discussion that would offer the ability to connect devices in home networks or other networks using multiple different link layer networking technologies such as, for example, IEEE P1901 power line communications (PLC), IEEE 802.11 Wi-Fi, IEEE 802.3 Ethernet, Multimedia over Coax Alliance (MoCA) 1.1, and/or other networking technologies. IEEE P1905.1 defines an abstraction layer that provides a common data and control service access point to heterogeneous networking technologies to provide a seamless user experience. The different networking technologies may be employed due to the location of the network device in the home, the capabilities of the network device, specific quality-of-service needs of the application, and/or other reasons.

Various embodiments of the present disclosure facilitate network security parameter generation and distribution within IEEE P1905.1 networks and/or similar networks. In one embodiment, a single converged network password may be provided by the user, and the individual security and privacy parameters for the native security/privacy protocol of each supported link layer technology may be derived from this password. Examples of such native protocols may include IEEE 1901 Simple Connect, Wi-Fi Protected Setup (WPS), and so on. In another embodiment, push-button pairing with key distribution may be used to pair any network device to the converged data communication network. A button could be pushed on a new device and another button could be pushed on any other device on the converged network within a time period to facilitate pairing, even if the two devices do not share a common link of the same link layer networking technology.

The term "pairing" is used herein to refer to a network device authenticating to a converged network that is protected by encryption and/or other security/privacy controls. In various embodiments, pairing exchanges network keys and not passwords, and passwords cannot be derived from the keys. Furthermore, network separation may be maintained such that the keys from one converged network are not distributed to devices of a different converged network. In the following discussion, a general description of the system and its components is provided, followed by a discussion of the operation of the same.

Figure 1:
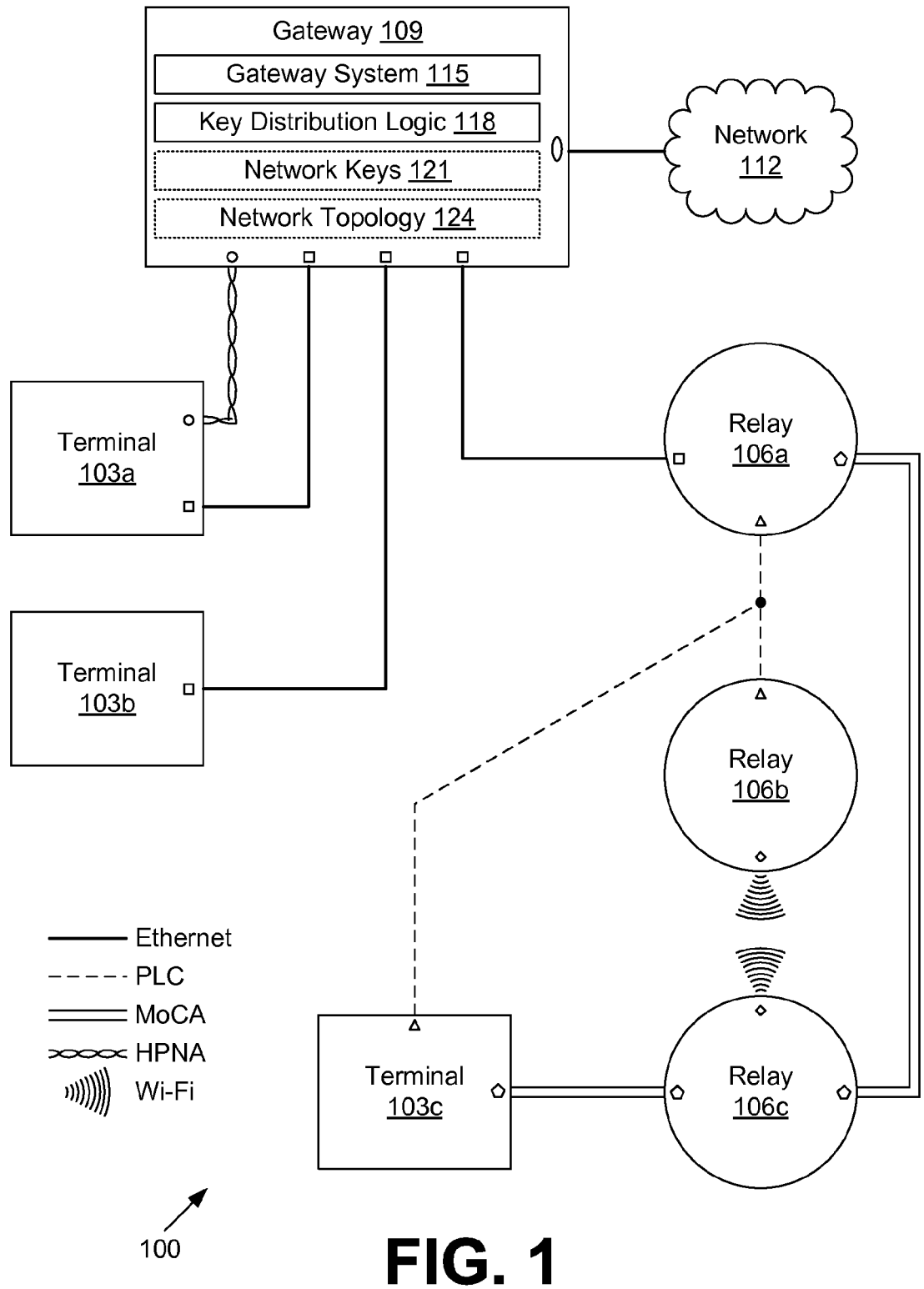
FIG. 1 is a drawing of a converged network according to various embodiments of the present disclosure.

With reference to FIG. 1, shown is one example of a converged network 100 according to various embodiments. The converged network 100 facilitates data communication among a plurality of terminals 103, a plurality of relays 106, a gateway 109, and a network 112. The network 112 includes, for example, the Internet, intranets, extranets, wide area networks (WANs), local area networks (LANs), wired networks, wireless networks, or other suitable networks, etc., or any combination of two or more such networks. Although the gateway 109 and network 112 are shown in FIG. 1, the gateway 109 and/or the network 112 may be absent from other examples of converged networks 100.

The terminals 103 and relays 106 correspond to converged network devices, which may include any type of computing device. Each terminal 103 and relay 106 corresponds to a converged network device including an abstraction layer between its logical link control (LLC) layer and the underlying heterogeneous link layers (media access control/physical layers (MAC/PHY)). Each terminal 103 is able to relay converged network management frames to other converged network devices. Each relay 106 is able to relay converged network management frames as well as data frames to other converged network devices.

In the example of FIG. 1, the converged network 100 employs five heterogeneous link layer technologies: Ethernet, PLC, MoCA, HomePNA (HPNA) connection over phone line, and Wi-Fi. The networking technologies shown in FIG. 1 constitute merely one non-limiting example of the heterogeneous networking technologies that may be employed in a converged network 100. The connections between the terminals 103, relays 106, and the gateway 109 are illustrated in FIG. 1 using the respective indicia from the legend of FIG. 1. Each converged network interface is depicted in FIG. 1 with a respective shape for each of the heterogeneous networking technologies. An Ethernet interface is depicted by a square, a PLC interface is depicted by a triangle, a MoCA interface is depicted by a pentagon, an HPNA interface is depicted by a circle, and a Wi-Fi interface is depicted by a diamond.

The gateway 109 may include a gateway system 115, key distribution logic 118, and other executable applications and/or digital logic. The gateway 109 may store data such as network keys 121, a network topology 124, and/or other data. In the common case, the gateway system 115 provides access to the WAN network 112 for the terminals 103 and relays 106 through a cable modem, digital subscriber line (DSL), WiMAX, plain old telephone service (POTS) dial-up, integrated services digital network (ISDN), T1, and/or another type of connection. The gateway system 115 may include routing functionality, firewall functionality, network address translation (NAT) functionality, and/or other functionality.

In one embodiment, the key distribution logic 118 provides centralized key distribution functionality for the converged network 100. The network keys 121 for the segments or portions of the converged network 100 corresponding to different networking technologies may be maintained in the gateway 109. In addition, the network topology 124 for the converged network 100 may be maintained in the gateway 109 in order for the key distribution logic 118 to distribute the appropriate network keys 121. In another embodiment, the key distribution logic 118 may be executed in all of the converged network devices to provide decentralized key distribution functionality as will be described. Further, in yet another embodiment, the key distribution logic 118 may be executed in a different converged network device from the gateway 109 to provide centralized key distribution functionality.

Figure 2:
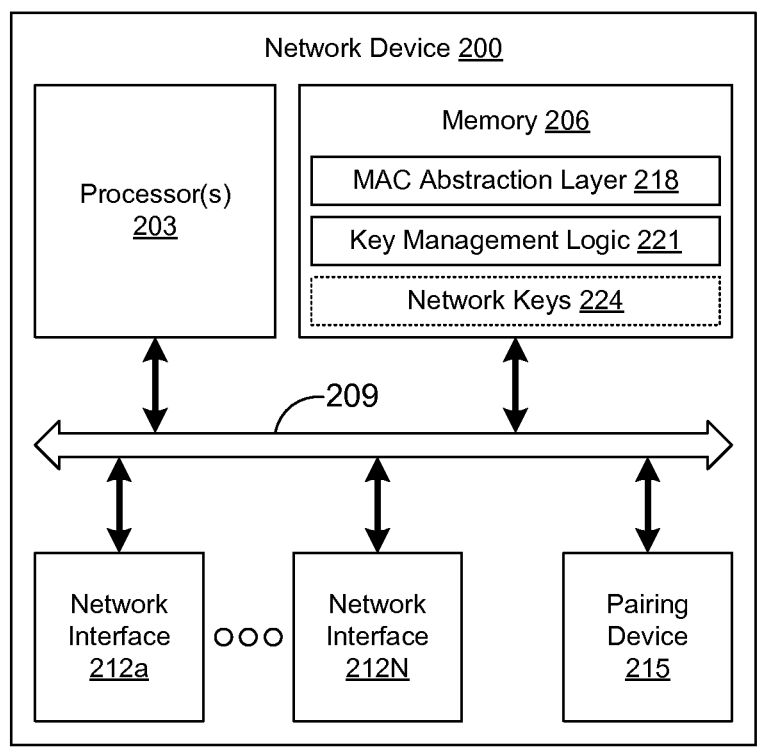
FIG. 2 is a schematic block diagram that provides one example illustration of a network device employed in the converged network of FIG. 1 according to various embodiments of the present disclosure.

Turning now to FIG. 2, shown is a schematic block diagram of a network device 200 according to an embodiment of the present disclosure. The network device 200 may correspond to a terminal 103 (FIG. 1) or a relay 106 (FIG. 1) in the converged network 100 (FIG. 1). The network device 200 includes at least one processor circuit, for example, having a processor 203 and a memory 206, both of which are coupled to a local interface 209. To this end, the network device 200 may comprise, for example, at least one general-purpose computing device, at least one embedded computing device, a router, a switch, and/or any other device that may be coupled to the converged network 100. The local interface 209 may comprise, for example, one or more data buses with an accompanying address/control bus or other bus structure as can be appreciated.

Also coupled to the local interface 209 may be a plurality of network interfaces 212a . . . 212N and a pairing device 215. The network interfaces 212 correspond to MAC/PHY interfaces to the converged network 100, which may employ different MAC/PHY networking technologies in some cases. The pairing device 215 may correspond to a push-button pairing device, a universal serial bus (USB) dongle to initiate pairing, a biometric pairing device, a software-based virtual pairing device, and/or any other system of coordination to initiate authentication to and pairing with the converged network 100 without having to specify network passwords manually.

Stored in the memory 206 are both data and several components that are executable by the processor 203. In particular, stored in the memory 206 and executable by the processor 203 are a MAC abstraction layer 218, key management logic 221, and potentially other applications. Also stored in the memory 206 may be network keys 224 and other data. In addition, an operating system may be stored in the memory 206 and executable by the processor 203. In various embodiments, all or portions of the MAC abstraction layer 218 and/or key management logic 221 may correspond to digital logic that is not executed separately by a processor 203.

The MAC abstraction layer 218 is executed to provide a common data and control service access point to various heterogeneous networking technologies. The MAC abstraction layer 218 may support dynamic interface selection for transmission of packets arriving from any network interface 212 or upper protocol layers. The MAC abstraction layer 218 may also support end-to-end quality of service (QoS). The key management logic 221 may be executed in various embodiments to generate network keys 224, share network keys 224 with other network devices 200, obtain network keys 224 from other network devices 200, and/or perform other functions.

Figure 3:
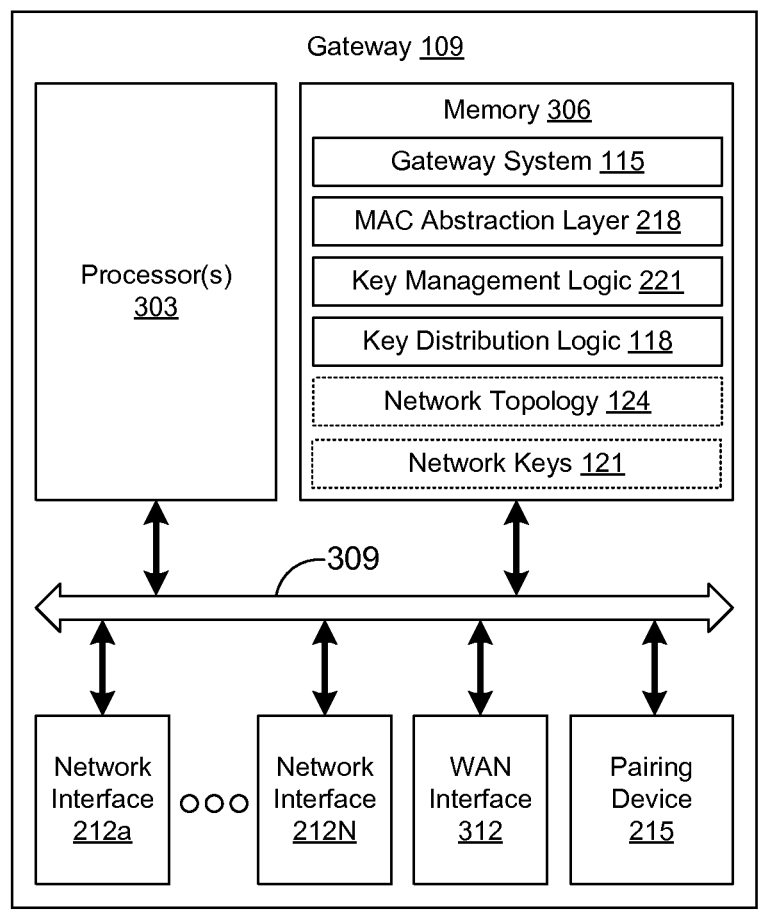
FIG. 3 is a schematic block diagram that provides one example illustration of a gateway employed in the converged network of FIG. 1 according to various embodiments of the present disclosure.

Moving on to FIG. 3, shown is a schematic block diagram of a gateway 109 according to an embodiment of the present disclosure. The gateway 109 includes at least one processor circuit, for example, having a processor 303 and a memory 306, both of which are coupled to a local interface 309. To this end, the gateway 109 may comprise, for example, at least one general-purpose computing device, at least one embedded computing device, a router, a switch, and/or any other device that may be coupled to the converged network 100 (FIG. 1). The local interface 309 may comprise, for example, one or more data buses with an accompanying address/control bus or other bus structure as can be appreciated. Also coupled to the local interface 309 may be a plurality of network interfaces 212a . . . 212N (FIG. 2), a pairing device 215 (FIG. 2), and a WAN interface 312. The WAN interface 312 is used to connect the gateway 109 to the network 112 (FIG. 1).

Stored in the memory 306 are both data and several components that are executable by the processor 303. In particular, stored in the memory 306 and executable by the processor 303 are the gateway system 115, a MAC abstraction layer 218, key management logic 221, the key distribution logic 118, and potentially other applications. Also stored in the memory 306 may be the network topology 124, the network keys 121, and other data. In addition, an operating system may be stored in the memory 306 and executable by the processor 303. In various embodiments, all or portions of the gateway system 115, the MAC abstraction layer 218, the key management logic 221, and/or the key distribution logic 118 may correspond to digital logic that is not executed separately by a processor 303.

Figure 4:
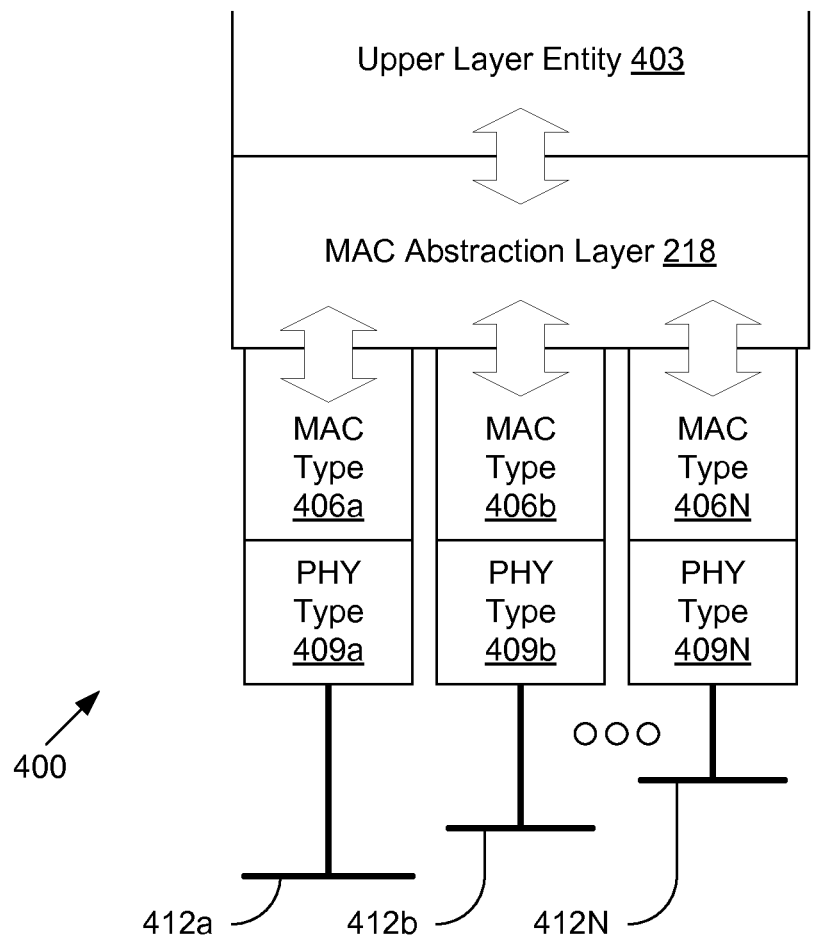
FIG. 4 is a diagram representing a layered network model employed in the converged network of FIG. 1 according to various embodiments of the present disclosure.

Continuing on to FIG. 4, shown is a diagram representing a layered network model 400 employed in the converged network 100 (FIG. 1) according to various embodiments of the present disclosure. In the layered network model 400, an upper layer entity 403 passes data to the MAC abstraction layer 218 for sending to the converged network 100 and obtains data from the converged network 100 by way of the MAC abstraction layer 218. The upper layer entity 403 may correspond to layer 3 or higher according to the Open Systems Interconnection (OSI) model. For example, the upper layer entity 403 may correspond to the Internet Protocol (IP), User Datagram Protocol (UDP), Transmission Control Protocol (TCP), and/or other upper layer entities 403.

The MAC abstraction layer 218 provides a single, unified MAC-agnostic interface to the upper layer entity 403. The MAC abstraction layer 218 may provide one or more MAC-specific interfaces to the abstraction layer for the network interfaces 212 (FIGS. 2 and 3). In FIG. 4, a plurality of MAC types 406a, 406b . . . 406N are shown in conjunction with a plurality of PHY types 409a, 409b . . . 409N. Each of the PHY types is coupled to a respective one of a plurality of network segments 412a, 412b . . . 412N. The network segments 412 may respectively correspond to Wi-Fi, IEEE 1901, MoCA, Ethernet, and/or other types of network segments 412. From the operating system standpoint in a network device 200 (FIG. 1), the MAC abstraction layer 218 may be seen as a single device exporting data and control service access points (SAPs). A MAC address (e.g., a 48-bit address or some other length) may be allocated to the MAC abstraction layer 218. The MAC address may be unique per converged network 100.

Referring now to FIGS. 1-4, a general description of the operation of the various components of the converged network 100 is provided. To begin, the setting of a hypothetical home is used to describe the various components of FIG. 1. Suppose, for example, that the gateway 109 is a small integrated router/switch device that is located in the basement of the house, near the termination of a circuit for the network 112. In this example, the gateway 109 has a HomePNA network interface 212 and multiple Ethernet network interfaces 212 corresponding to separate ports which may or may not be bridged. The Ethernet network may or may not be secured by way of IEEE 802.1AE (MACsec) or another standard. The Wi-Fi network may be secured by Wi-Fi Protected Access 2 (WPA2) or another standard.

Suppose, for example, that terminal 103a is a laptop computer which may sometimes be near either Ethernet ports or telephone jacks in the home. Terminal 103a is connected to the converged network 100 through a HomePNA network interface 212 to the gateway 109 and/or through an Ethernet network interface 212 to the gateway 109. Suppose, for example, that terminal 103b is a desktop computer that is also physically located in the basement of the home. Terminal 103b is connected to the converged network 100 by way of an Ethernet network interface 212 to the gateway 109.

Suppose, for example, that relay 106a is a device in the basement that is configured to relay network traffic between the gateway 109 over an Ethernet network interface 212 and to other network devices 200 over a PLC network interface 212 and a MoCA network interface 212. Thus, devices may connect to the converged network 100 through existing coaxial cable and/or power wiring in other rooms of the house, without having to run Cat5e or other cabling. Suppose, for example, that relay 106b is located on the main level of the home and is used to connect potential devices on a Wi-Fi network to the converged network 100. To this end, the relay 106b may include a PLC network interface 212 and a Wi-Fi network interface 212.

Suppose, for example, that relay 106c is a set-top box with two MoCA network interfaces 212 and a Wi-Fi network interface 212. Suppose that the relay 106c is in a bedroom of the upper level of the home that has a coaxial cable outlet. The relay 106c may be connected to the relay 106b over Wi-Fi, and the relay 106a over MoCA. Suppose, for example, that the terminal 103c is a digital television also located in the upper level bedroom. Suppose that a MoCA network interface 212 of the terminal 103c is connected to the relay 106c by way of a coaxial cable, and that a PLC network interface 212 of the terminal 103c is connected to the relay 106a and the relay 106b by way of the power wiring of the home.

In addition to connecting network devices 200 having network interfaces 212 of different networking technologies, it can be seen in FIG. 1 that redundant paths may be provided in the converged network 100. Such redundant paths may be leveraged by the MAC abstraction layer 218 to increase throughput between network devices 200. As a non-limiting example, a HomePNA link between the terminal 103a and gateway 109 may provide a 20 Megabit per second data rate, while the 10-Base-T link between the terminal 103a and gateway 109 may provide a 10 Megabit per second data rate. The MAC abstraction layer 218 may be configured to combine the links so as to provide a total data rate of up to 30 Megabits per second between the terminal 103a and the gateway 109.

Moreover, the redundant paths of the converged network 100 may be used to provide reliable connections when the connectivity of one link is degraded or lost. As a non-limiting example, a PLC connection may be susceptible to impulse noise and/or other interference when an electrical device is operated in the home. Consequently, network traffic between the terminal 103c and the relay 106a may be routed over the two MoCA links instead of the PLC link when the PLC link between terminal 103c and relay 106a is degraded, overloaded, unavailable, etc.

Network devices 200 may be paired to the converged network 100 through either user password configuration or a push-button configuration method. In user password configuration, a user manually provides the same converged network password to each network device 200. The individual security/privacy parameters (e.g., the network keys 224) of the native security/privacy protocol of each supported link layer technology are derived from this single converged network password. As a non-limiting example, a hash function may be employed to generate an individual password for each supported link layer technology. As another non-limiting example, a hash function may be employed to generate the largest password size required by any one of the link layer technologies, and the password may be truncated to create smaller passwords for other link layer technologies. Once a link layer password is derived from the converged network password, each network interface 212 performs its own native security protocol and may obtain additional security parameters.

With a push-button configuration method, whenever a pairing event is generated in a network device 200 through a pairing device 215, the network device 200 broadcasts the pairing event to notify the other network devices 200 of the converged network 100. Upon obtaining the pairing event, a network device 200 initiates a native push-button pairing protocol on each of its supported network interfaces 212. The network devices 200 pair through the native push-button pairing protocol. If the new network device 200 is connected through multiple link types, the native push-button pairing protocol of each link is performed to obtain the shared network key 224 of each link type. Network keys 224 may be distributed through a centralized key distribution approach or a decentralized key distribution approach.

It is noted that the pairing device 215 may be physically or logically actuated. That is, a physical button on the network device 200 may be pushed, or a logical pairing device 215 may be actuated through software. Moreover, other types of pairing devices 215 may be used other than push buttons, e.g., USB dongles, biometric scanners, etc.

In some scenarios, push-button pairing may be used in conjunction with password-based pairing within the same converged network 100. In a first scenario, suppose that two network devices $D_1$ and $D_2$ pair through a native pairing event protocol and $Key_{1A}$ is generated. Suppose that network device $D_3$ supports only a user password. Before pairing $D_3$, the user enters a password on $D_1$ (or $D_2$). $D_1$ derives $Key_{2A}$, $Key_{2B}$, and $Key_{2C}$ from the user password. $D_1$ broadcasts $Key_{2A}$, $Key_{2B}$, and $Key_{2C}$ to $D_2$. $Key_{2A}$, $Key_{2B}$, and $Key_{2C}$ may overwrite any previous key, such as $Key_{1A}$. $D_3$ is paired to the converged network after the user enters the password. $D_3$ derives the same $Key_{2A}$, $Key_{2B}$, and $Key_{2C}$ from the user password. Suppose that network device $D_4$ supports a native pairing event protocol but not password-based pairing. $D_4$ obtains the $Key_{2A}$, $Key_{2B}$, and/or $Key_{2C}$ through the native pairing event protocol.

In a second scenario, suppose that a user enters a password in network devices $D_1$ and $D_2$. $D_1$ and $D_2$ derive the $Key_{2A}$, $Key_{2B}$, and $Key_{2C}$ from the user password. Suppose that network device $D_3$ supports a native pairing event protocol and not password-based pairing. $D_3$ may obtain the $Key_{2A}$, $Key_{2B}$, and/or $Key_{2C}$ by way of a native pairing event protocol from either $D_1$ or $D_2$ if they support that native pairing event protocol. Further discussion of pairing in a converged network 100 will next be provided in connection with FIGS. 5-11.

Figure 5:
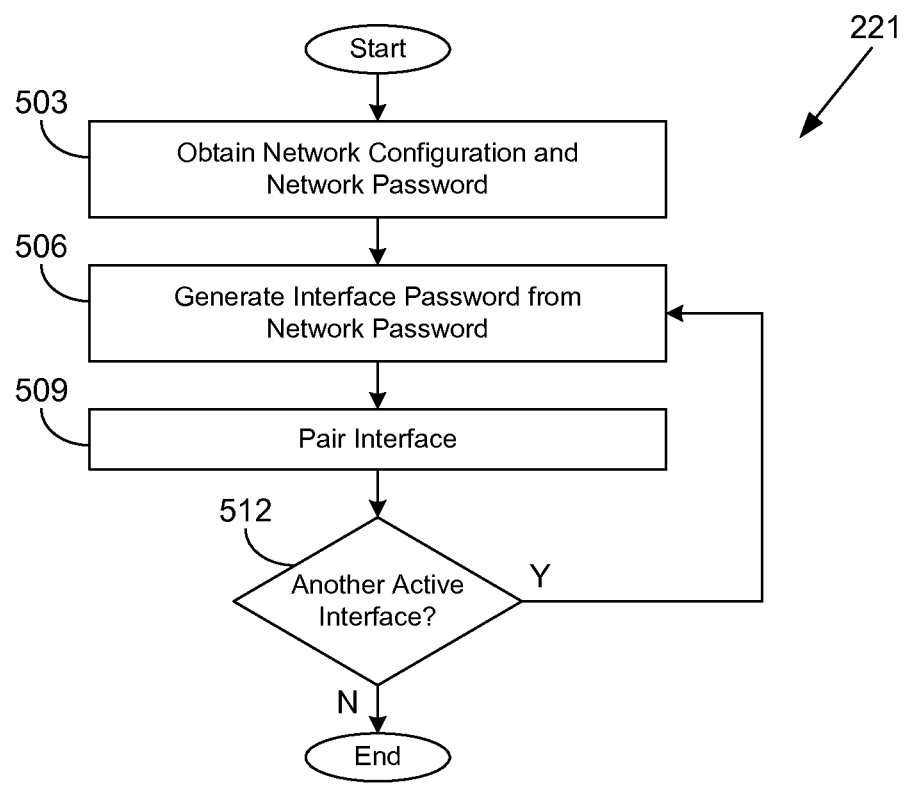
FIGS. 5-8 are flowcharts illustrating examples of functionality implemented as portions of key management logic and/or key distribution logic executed in a network device in the converged network of FIG. 1 according to various embodiments of the present disclosure.

Referring next to FIG. 5, shown is a flowchart that provides one example of the operation of a portion of the key management logic 221 (FIG. 2) according to various embodiments. In particular, FIG. 5 relates to embodiments providing pairing in a converged network 100 (FIG. 1) with user password configuration. It is understood that the flowchart of FIG. 5 provides merely an example of the many different types of functional arrangements that may be employed to implement the operation of the portion of the key management logic 221 as described herein. As an alternative, the flowchart of FIG. 5 may be viewed as depicting an example of steps of a method implemented in the network device 200 (FIG. 2) according to one or more embodiments.

Beginning with box 503, the key management logic 221 obtains the network configuration and a converged network password from a user. For example, the user may open a graphical user interface configuration dialog provided by an operating system of the network device 200. Alternatively, the network device 200 may have an integrated screen and input devices for the user to specify the network configuration and the converged network password.

In box 506, the key management logic 221 generates an interface password for one of the network interfaces 212 from the converged network password. Different network interfaces 212 of the network device 200 may have different password size requirements. In one embodiment, the key management logic 221 first generates one password using a hash function at the greatest size required and second truncates the password as necessary for each network interface 212. In another embodiment, the key management logic 221 uses a hash function to generate a separate password for each of the different network interfaces 212 from the single converged network password. The hash functions used may be one-way hashes such that the converged network password is not derivable from the interface passwords. In various embodiments, all network segments 412 (FIG. 4) of the same network type may employ the same interface password, while in other embodiments, different interface passwords may be employed for different network segments 412 of the same network type.

In box 509, the network interface 212 is paired using the interface password generated at least in part from the converged network password. The network interface 212 is paired using the native security/privacy protocol of the link layer technology of the network interface 212. Additional security parameters may be obtained by way of the native security/privacy protocol and stored by the key management logic 221 in the network keys 224. In box 512, the key management logic 221 determines whether another network interface 212 is active in the network device 200. If another network interface 212 is active, the key management logic 221 returns to box 506 and generates an interface password for the next network interface 212 to be paired. Otherwise, the portion of the key management logic 221 ends.

Figure 6:
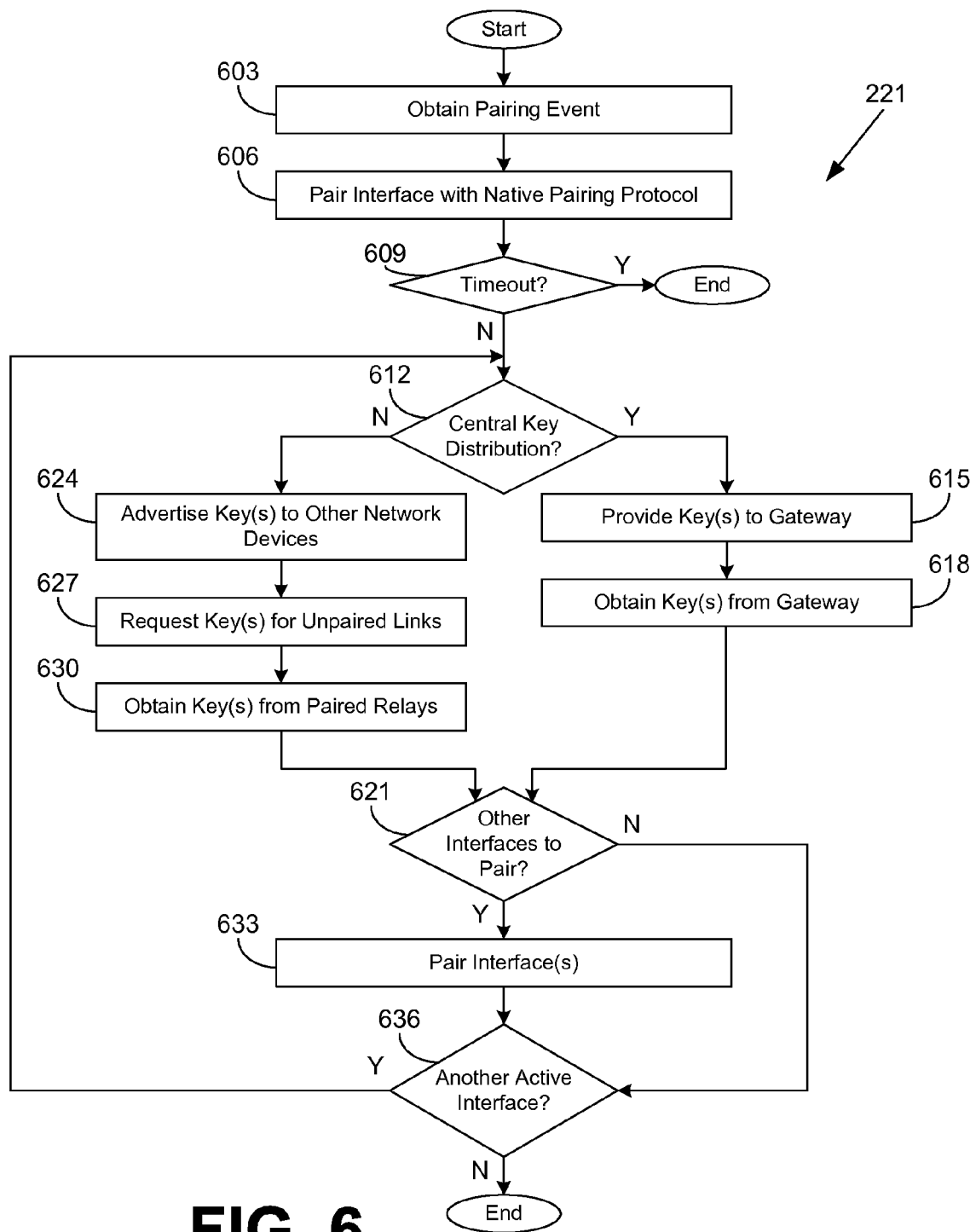

Turning now to FIG. 6, shown is a flowchart that provides another example of the operation of a portion of the key management logic 221 (FIG. 2) according to various embodiments. In particular, FIG. 6 relates to embodiments providing pairing in a converged network 100 (FIG. 1) with push-button pairing and key distribution. It is understood that the flowchart of FIG. 6 provides merely an example of the many different types of functional arrangements that may be employed to implement the operation of the portion of the key management logic 221 as described herein. As an alternative, the flowchart of FIG. 6 may be viewed as depicting an example of steps of a method implemented in the network device 200 (FIG. 2) according to one or more embodiments.

Beginning with box 603, the key management logic 221 obtains a pairing event, such as a physical or logical button push, etc., from a pairing device 215 (FIG. 1) of the network device 200. In box 606, the key management logic 221 pairs a network interface 212 (FIG. 1) using a native pairing protocol of the link layer technology used by the network interface 212. Through this task, a network key 224 (FIG. 1) may be generated for the network interface 212. In box 609, the key management logic 221 determines whether a timeout has occurred. For example, although a pairing event may generated in the network device 200, it may be the case that no corresponding pairing event is received from a remote network device 200 of the converged network 100 before the expiration of a predefined length of time. If a timeout occurs, the pairing of the link fairs, and the portion of the key management logic 221 ends.

If a timeout does not occur, the key management logic 221 continues to box 612. In box 612, the key management logic 221 determines whether central key distribution is used. If central key distribution is used, the key management logic 221 continues to box 615 and provides any network keys 224 generated by the pairing to the gateway 109 (FIG. 1). In box 618, the key management logic 221 may obtain network keys 224 from the gateway 109 for the other active network interfaces 212 of the network device 200. The key management logic 221 continues to box 621.

If the key management logic 221 determines in box 612 that central key distribution is not used, a decentralized approach to key distribution is instead employed, and the key management logic 221 transitions from box 612 to box 624. In box 624, the key management logic 221 advertises the network keys 224 of the network device 200 to other network devices 200 with which it is paired. In box 627, the key management logic 221 requests network keys 224 for the unpaired links of the network device 200. This request may be propagated through the converged network 100 away from the network device 200. Ultimately, the key management logic 221 obtains the missing network keys 224 by way of paired relays 106 (FIG. 1). The key management logic 221 continues to box 621.

In box 621, the key management logic 221 determines whether there are other network interfaces 212 of the network device 200 which may be paired with the newly available network keys 224. If so, the key management logic 221 initiates pairing of the network interface(s) 212 in box 633. The key management logic 221 proceeds to box 636. If there are no other network interfaces 212 to pair, the key management logic 221 also proceeds to box 636. In box 636, the key management logic 221 determines whether another network interface 212 of the network device 200 has become active. For example, a user may plug in a USB Wi-Fi network interface 212 or other pluggable network interface 212 into the network device 200. If another network interface 212 has become active, the key management logic 221 returns to box 612 and proceeds to obtain network keys 224 for the network interface 212. Otherwise, the portion of the key management logic 221 ends.

Figure 7:
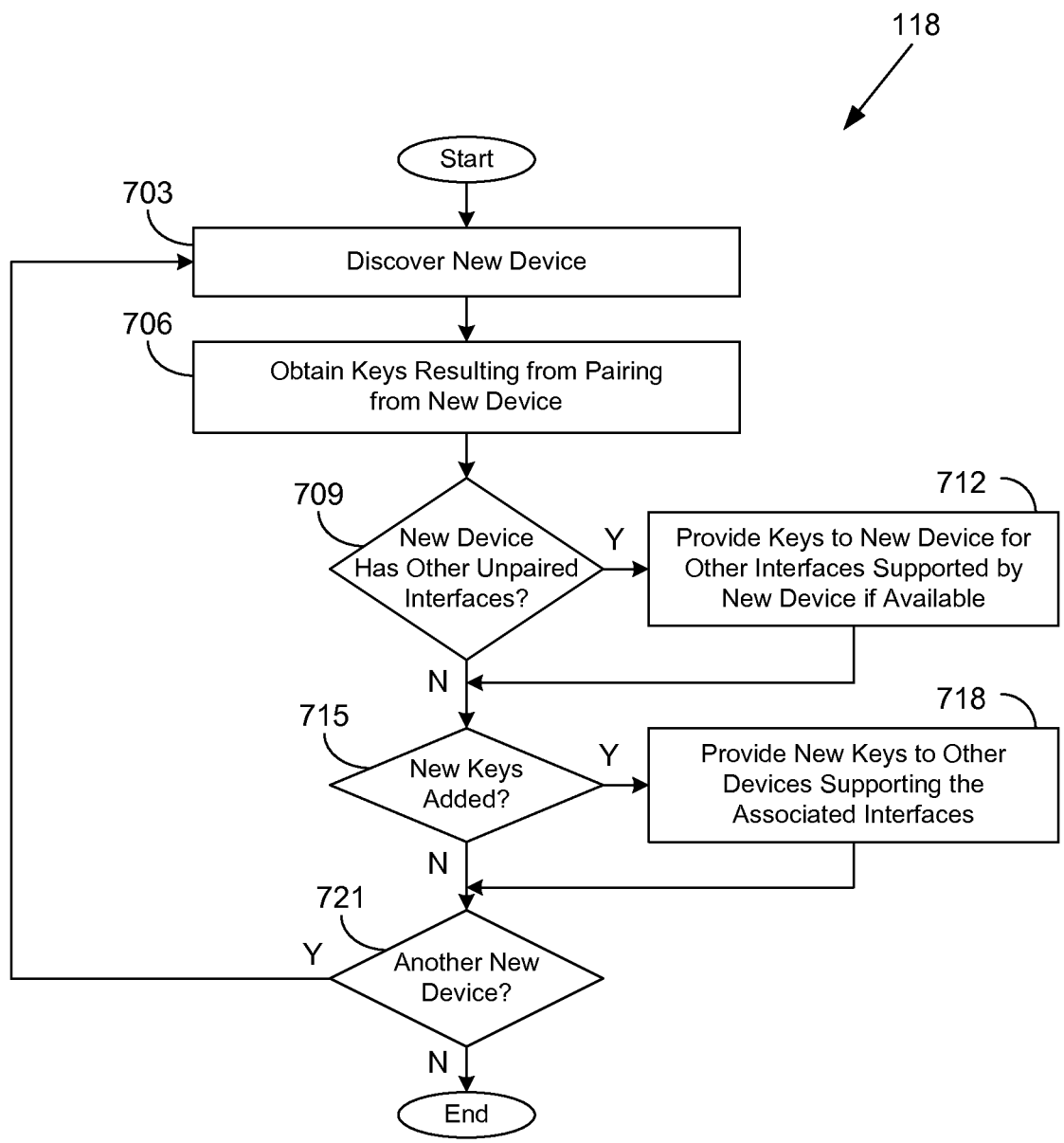

Moving on to FIG. 7, shown is a flowchart that provides one example of the operation of a portion of the key distribution logic 118 (FIG. 1) according to various embodiments. It is understood that the flowchart of FIG. 6 provides merely an example of the many different types of functional arrangements that may be employed to implement the operation of the portion of the key distribution logic 118 as described herein. As an alternative, the flowchart of FIG. 7 may be viewed as depicting an example of steps of a method implemented in the gateway 109 (FIG. 1) according to one or more embodiments.

Beginning with box 703, the key distribution logic 118 discovers a new network device 200 (FIG. 2) that has been added to the network topology 124 (FIG. 1) of the converged network 100 (FIG. 1). In box 706, the key distribution logic 118 obtains the network keys 224 (FIG. 2) resulting from pairing the new network device 200. The network keys 224 may be stored in network keys 121 (FIG. 1) which may map the network keys 224 to the network topology 124.

In box 709, the key distribution logic 118 determines whether the new network device 200 has other unpaired network interfaces 212 (FIG. 2). For example, the key distribution logic 118 may obtain a request from the network device 200 for network keys 224 for its unpaired network interfaces 212. If so, the key distribution logic 118 provides the appropriate network keys 224 to the new network device 200 for the other network interfaces 212 supported by the new network device 200, if available. The key distribution logic 118 proceeds to box 715. If the new network device 200 does not have other unpaired network interfaces 212, the key distribution logic 118 also continues from box 709 to box 715.

In box 715, the key distribution logic 118 determines whether new network keys 224 have been added to the network keys 121 as a result of the pairing of the new network device 200. If new network keys 224 have been added, the key distribution logic 118 provides the new network keys 224 to other network devices 200 connected to the converged network 100 that support the types of network interfaces 212 associated with the new network keys 224. The key distribution logic 118 continues to box 721. If no new network keys 224 are added, the key distribution logic 118 transitions from box 715 to box 721.

In box 721, the key distribution logic 118 determines whether another new network device 200 has been added to the converged network 100. If another new network device 200 has been added, the key distribution logic 118 returns to box 703. If no new network device 200 has been added, the portion of the key distribution logic 118 ends.

Figure 8:
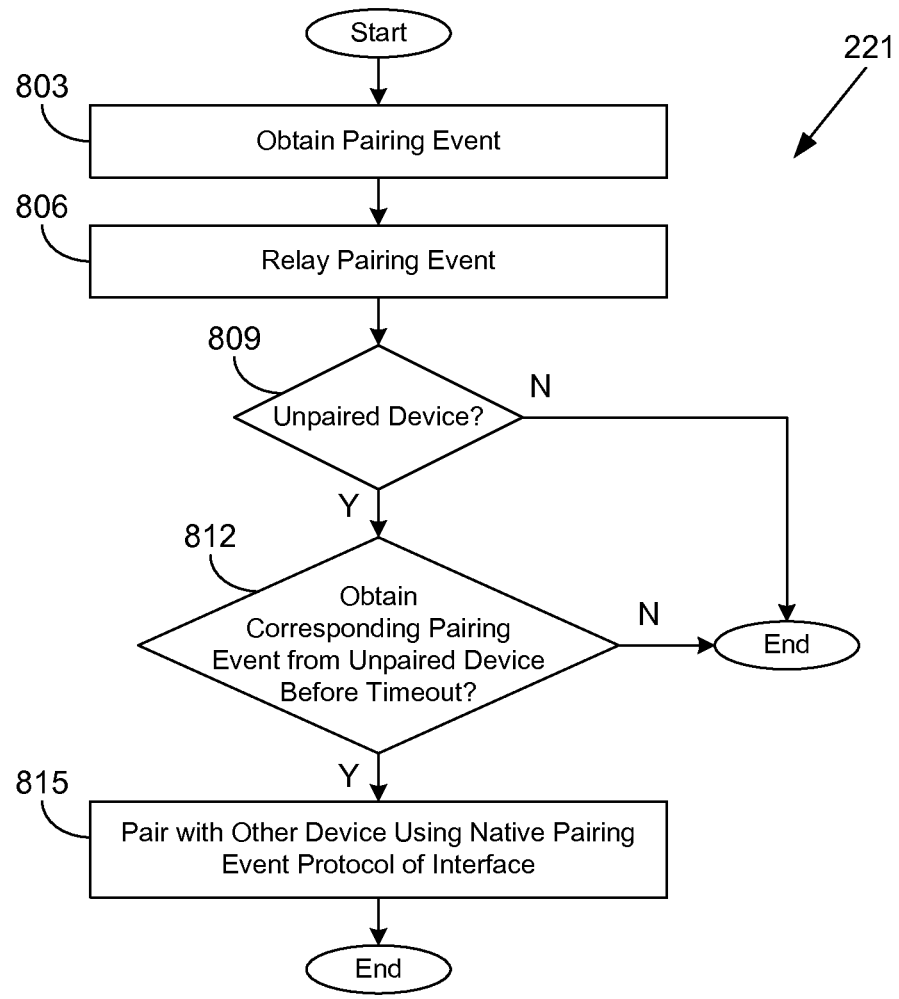

Moving on to FIG. 8, shown is a flowchart that provides another example of the operation of a portion of the key management logic 221 (FIG. 2) according to various embodiments. In particular, FIG. 8 relates to relaying pairing events and initiating pairing based on obtaining pairing events. It is understood that the flowchart of FIG. 8 provides merely an example of the many different types of functional arrangements that may be employed to implement the operation of the portion of the key management logic 221 as described herein. As an alternative, the flowchart of FIG. 8 may be viewed as depicting an example of steps of a method implemented in the network device 200 (FIG. 2) according to one or more embodiments.

Beginning with box 803, the key management logic 221 obtains a pairing event. The pairing event may be a local physical or logical button push or may be obtained from another network device 200 over the converged network 100 (FIG. 1). In box 806, the key management logic 221 relays the pairing event through other network interfaces 212 (FIG. 2) of the network device 200. In box 809, the key management logic 221 determines whether there is an unpaired network device 200 connected to the network device 200. If there is not an unpaired network device 200 connected to the network device 200, the portion of the key management logic 221 ends.

Otherwise, if there is an unpaired network device 200 connected to the network device 200, the key management logic 221 instead proceeds to box 812. In box 812, the key management logic 221 determines whether a corresponding pairing event is obtained from the unpaired network device 200 before a timeout. Such a corresponding pairing event may be obtained before or after the pairing event obtained in box 803, but the length of time between the two pairing events is limited to a predefined length of time. If a timeout occurs, the portion of the key management logic 221 ends without pairing the unpaired network device 200.

If a timeout has not occurred, the key management logic 221 instead transitions to box 815 and pairs with the other network device 200 using the native pairing event protocol (e.g., a push-button pairing protocol or other protocol) of the unpaired network interface 212 of the other network device 200. It is noted that the unpaired network device 200 may have multiple network interfaces 212. In various embodiments, no pairing precedence is established. Once one network interface 212 is paired, the network keys 224 corresponding to the unpaired network interface(s) 212 may be distributed to the other network device 200 via the paired network interface 212. Thereafter, the portion of the key management logic 221 ends.

Figure 9A:
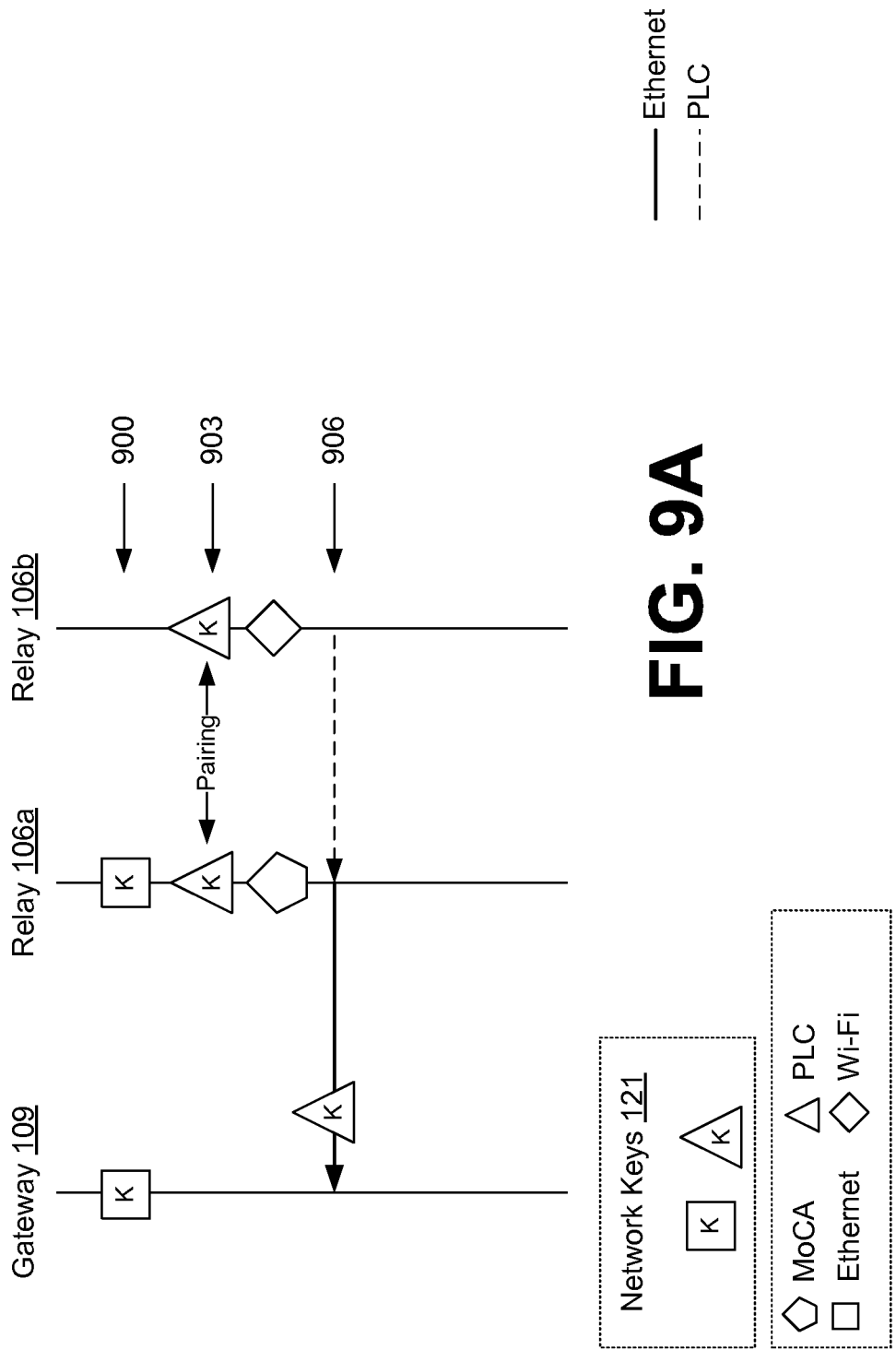
Figure 9C:
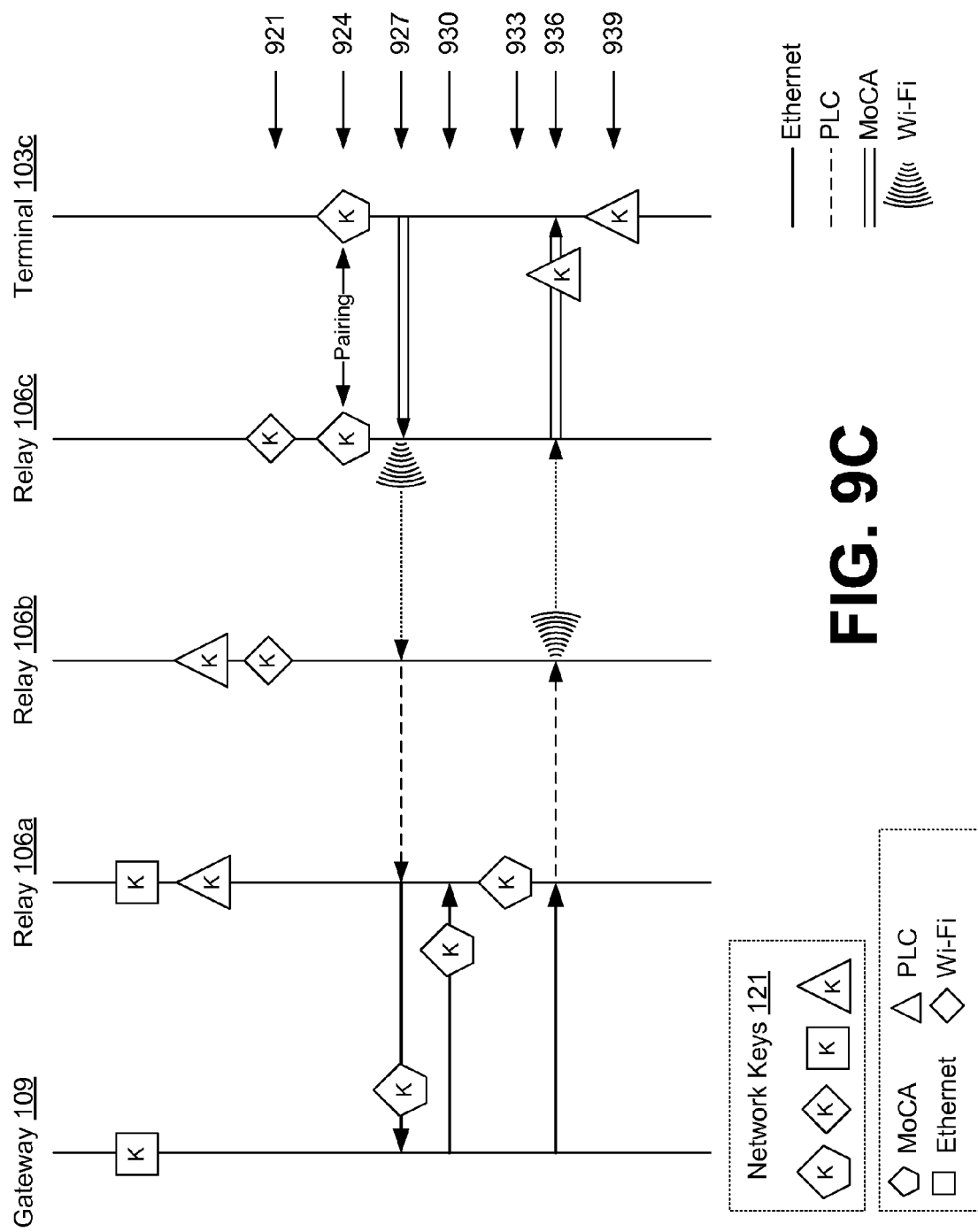

With reference to FIGS. 9A-9C, shown are sequence diagrams illustrating one example of network key distribution among network devices 200 (FIG. 2) using centralized network key distribution by the gateway 109 (FIG. 1) in the converged network 100 (FIG. 1). The sample topology of the converged network 100 given in the example of FIG. 1 is employed. In FIGS. 9A-9C, a rectangle indicates an Ethernet network interface 212 (FIG. 2), a triangle indicates a PLC network interface 212, a diamond indicates a Wi-Fi network interface 212, and a pentagon indicates a MoCA network interface 212. A "K" inside the respective shape indicates a paired interface, while the absence of a "K" inside the respective shape indicates an unpaired interface.

Beginning with FIG. 9A, the gateway 109 and the relay 106a are initially paired in the converged network 100 by way of Ethernet network interfaces 212. The relay 106a also has unpaired PLC and MoCA network interfaces 212. At time 900, the relay 106b joins the converged network 100. The relay 106b initially has unpaired PLC and Wi-Fi network interfaces 212. At time 903, the relay 106b pairs with the relay 106a via a native pairing protocol of the PLC network interfaces 212. Network keys 224 (FIG. 2) are generated and exchanged. At time 906, the network keys 224 for the PLC network segment 412 (FIG. 4) are sent back to the gateway 109. Thus, the network keys 121 include security/privacy parameters for Ethernet and PLC network interfaces after time 906.

Next, in FIG. 9B, the relay 106c joins the converged network 100 at time 912. Initially, the relay 106c has unpaired MoCA and Wi-Fi network interfaces 212. At time 915, the relay 106c pairs with the relay 106b via a native pairing protocol of the Wi-Fi network interfaces 212. Network keys 224 are generated and exchanged. At time 918, the network keys 224 for the Wi-Fi network segment 412 are sent back to the gateway 109 by way of the relay 106a. Thus, the network keys 121 include security/privacy parameters for Ethernet, PLC, and Wi-Fi network interfaces 212 after time 918.

In FIG. 9C, the terminal 103c joins the converged network 100 at time 921. Initially, the terminal 103c has unpaired MoCA and PLC network interfaces 212. At time 924, the terminal 103c pairs with the relay 106c via a native pairing protocol of the MoCA network interfaces 212. Network keys 224 are generated and exchanged. At time 927, the network keys 224 for the MoCA network segment 412 are sent back to the gateway 109 by way of the relay 106a and the relay 106b. Thus, the network keys 121 include security/privacy parameters for Ethernet, PLC, Wi-Fi, and MoCA network interfaces after time 927.

At time 930, the gateway 109 provides the MoCA security/privacy parameters to the relay 106a. At time 933, the MoCA network interface 212 of the relay 106a becomes paired with the MoCA network interface 212 of the relay 106c using the security/privacy parameters provided by the gateway 109. At time 936, the gateway 109 provides the PLC security/privacy parameters to the terminal 103c. At time 939, the PLC network interface 212 of the terminal 103c becomes paired with the PLC network interface 212 of the relay 106a using the security/privacy parameters provided by the gateway 109. It is noted that the transfer of the PLC parameters at time 936 may occur before the transfer of the MoCA parameters at time 930, and the pairing at time 939 may occur before the pairing at time 933. Further, although certain tasks are shown sequentially in FIGS. 9A-9C, it is understood that they may occur in parallel or in other sequences in other embodiments.

Figure 10:
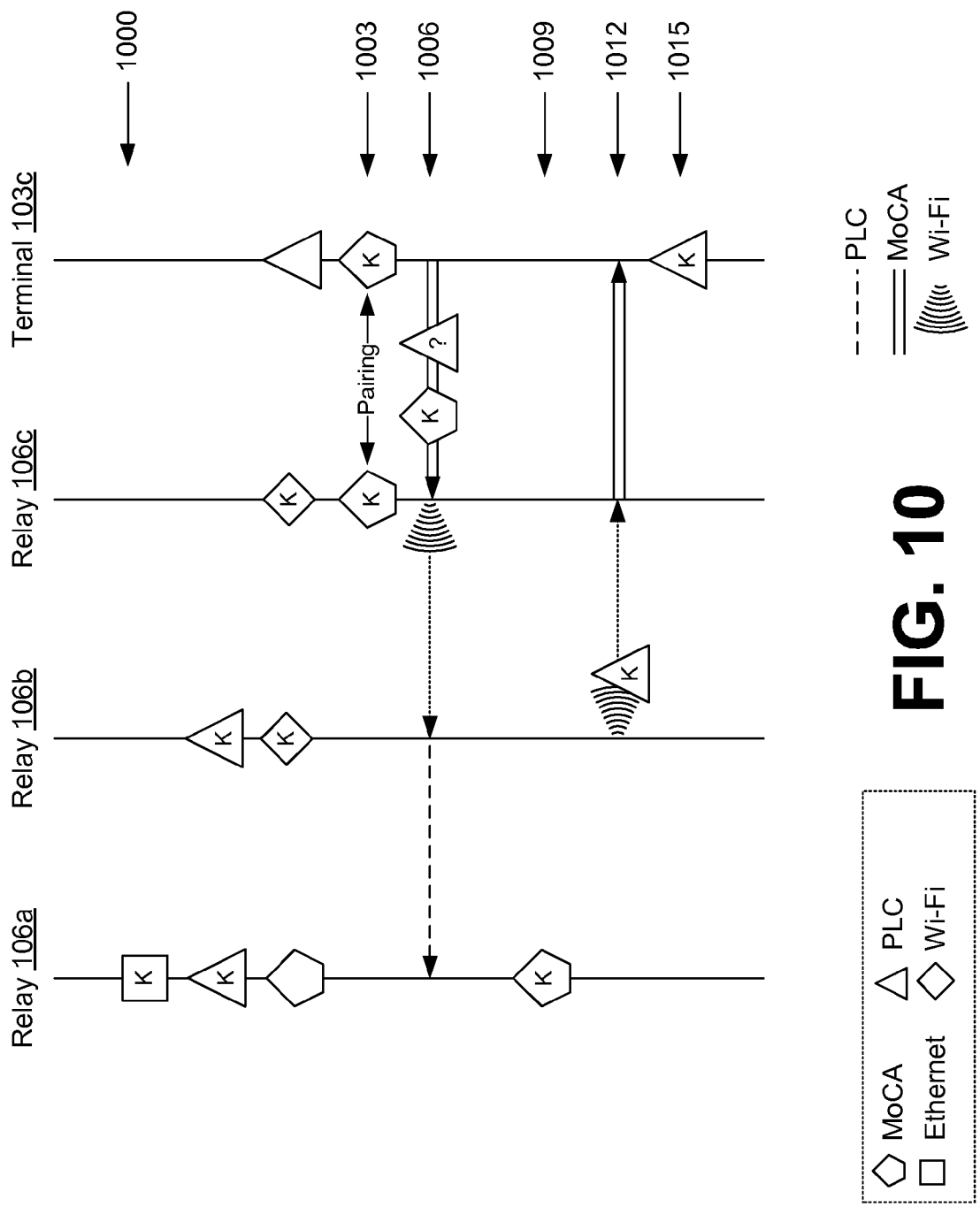
FIG. 10 is a sequence diagram illustrating network key distribution among network devices using decentralized network key distribution in the converged network of FIG. 1 according to various embodiments of the present disclosure.

With reference to FIG. 10, shown is a sequence diagram illustrating one example of network key distribution among network devices 200 (FIG. 2) using decentralized network key distribution in the converged network 100 (FIG. 1). The sample topology of the converged network 100 given in the example of FIG. 1 is employed. In FIG. 10, a rectangle indicates an Ethernet network interface 212 (FIG. 2), a triangle indicates a PLC network interface 212, a diamond indicates a Wi-Fi network interface 212, and a pentagon indicates a MoCA network interface 212. A "K" inside the respective shape indicates a paired interface, while the absence of a "K" inside the respective shape indicates an unpaired interface.

Initially, at time 1000, the relays 106a, 106b, and 106c are paired in the converged network 100. The relay 106a has paired Ethernet and PLC network interfaces 212 and an unpaired MoCA network interface 212. The relay 106b has paired PLC and Wi-Fi network interfaces 212. The relay 106c has a paired Wi-Fi network interface 212 and an unpaired MoCA network interface 212. The terminal 103c has unpaired PLC and MoCA network interfaces 212.

At time 1003, the terminal 103c joins the converged network 100 by pairing its MoCA network interface 212 with the MoCA network interface 212 of the relay 106c. Network keys 224 are generated and exchanged. At time 1006, the security/privacy parameters for the MoCA network segment 412 (FIG. 4) are propagated through the converged network 100 to the relay 106b and the relay 106a. A request for the PLC security/privacy parameters is also propagated. At time 1009, the MoCA network interface 212 of the relay 106a becomes paired using the security/privacy parameters for the MoCA network segment 412 propagated at time 1006.

At time 1012, the relay 106b responds to the request for the PLC security/privacy parameters and sends the PLC parameters to the terminal 103c by way of the relay 106c. At time 1015, the PLC network interface 212 of the terminal 103c becomes paired using the PLC parameters obtained at time 1012. Although certain tasks are shown sequentially in FIG. 10, it is understood that they may occur in parallel or in other sequences in other embodiments.

Continuing on to FIG. 11, shown is a sequence diagram illustrating pairing among network devices 200 (FIG. 2) relative to pairing events in the converged network 100 (FIG. 1). The sample topology of the converged network 100 given in the example of FIG. 1 is employed. In FIG. 11, a rectangle indicates an Ethernet network interface 212 (FIG. 1) and a pentagon indicates a MoCA network interface 212. A "K" inside the respective shape indicates a paired interface, while the absence of a "K" inside the respective shape indicates an unpaired interface.

Initially, at time 1100, the gateway 109 and relays 106a and 106b are paired in the converged network 100 by way of Ethernet and MoCA network interfaces 212. At time 1100, a pairing event (e.g., a physical or logical button press, etc.) is generated in the unpaired terminal 103c. At time 1103, a pairing event is generated in the gateway 109 and sent to the relay 106a over an Ethernet link. At time 1106, the relay 106a replicates the pairing event and forwards it to the relay 106b over a MoCA link. At time 1109, the relay 106b obtains the pairing event from the relay 106a.

Assuming that the time between time 1100 and time 1109 does not meet a timeout threshold, the relay 106b pairs with the terminal 103c using a native pairing protocol of the MoCA interfaces at time 1112. Security/privacy parameters for the MoCA network segment 412 (FIG. 1) may be generated. At time 1115, the MoCA network interface of the terminal 103c is paired to the converged network 100.

Referring back to FIGS. 2 and 3, it is understood that there may be other applications that are stored in the memory 206, 306 and are executable by the processor 203, 303 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 206, 306 and are executable by the processor 203, 303. In this respect, the term "executable" means a program file that is in a form that can ultimately be run by the processor

203, 303. Examples of executable programs may be, for example, a compiled program that can be translated into machine code in a format that can be loaded into a random access portion of the memory 206, 306 and run by the processor 203, 303, source code that may be expressed in proper format such as object code that is capable of being loaded into a random access portion of the memory 206, 306 and executed by the processor 203, 303, or source code that may be interpreted by another executable program to generate instructions in a random access portion of the memory 206, 306 to be executed by the processor 203, 303, etc. An executable program may be stored in any portion or component of the memory 206, 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 206, 306 is defined herein as including both volatile and nonvolatile memory and data storage components. Volatile components are those that do not retain data values upon loss of power. Nonvolatile components are those that retain data upon a loss of power. Thus, the memory 206, 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 203, 303 may represent multiple processors 203, 303 and the memory 206, 306 may represent multiple memories 206, 306 that operate in parallel processing circuits, respectively. In such a case, the local interface 209, 309 may be an appropriate network that facilitates communication between any two of the multiple processors 203, 303, between any processor 203, 303 and any of the memories 206, 306, or between any two of the memories 206, 306, etc. The local interface 209, 309 may comprise additional systems designed to coordinate this communication, including, for example, performing load balancing. The processor 203, 303 may be of electrical or of some other available construction.

Although the gateway system 115, the MAC abstraction layer 218, the key management logic 221, the key distribution logic 118, and various other systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 5-8 show the functionality and operation of an implementation of portions of the key management logic 221 and the key distribution logic 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 203, 303 in a computer system or other system. The machine code may be converted from the source code, etc. If embodied in hardware, each block may represent a circuit or a number of interconnected circuits to implement the specified logical function(s).

Although the flowcharts of FIGS. 5-8 show a specific order of execution, it is understood that the order of execution may differ from that which is depicted. For example, the order of execution of two or more blocks may be scrambled relative to the order shown. Also, two or more blocks shown in succession in FIGS. 5-8 may be executed concurrently or with partial concurrence. Further, in some embodiments, one or more of the blocks shown in FIGS. 5-8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the gateway system 115, the MAC abstraction layer 218, the key management logic 221, and the key distribution logic 118, that comprises software or code can be embodied in any non-transitory computer-readable medium for use by or in connection with an instruction execution system such as, for example, a processor 203, 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are Therefore, the following is claimed:

1. A system, comprising:
   a plurality of network devices in data communication by way of a converged data communications network employing a plurality of heterogeneous link layer technologies; and
   wherein at least one of the network devices includes a plurality of network interfaces to the converged data communications network, a first one of the network interfaces employs a first one of the heterogeneous link layer technologies, a second one of the network interfaces employs a second one of the heterogeneous link layer technologies, and the at least one of the network devices further includes network security parameter management logic that is configured to:
      obtain a converged network password, the at least one network device configured to use the converged network password for pairing of each of the plurality of network interfaces to the converged data communications network using native pairing protocols associated with the network interfaces; and
      connect to the converged data communications network by pairing one of the network interfaces using a native pairing protocol of a corresponding one of the heterogeneous link layer technologies based at least in part on the converged network password.

2. The system of claim 1, wherein the network security parameter management logic is further configured to:
   generate a first network password for the first one of the network interfaces based at least in part on the converged network password; and
   generate a second network password for the second one of the network interfaces based at least in part on the converged network password.

3. The system of claim 2, wherein the first network password and the second network password are each individually generated by applying a separate hash function to the converged network password.

4. The system of claim 2, wherein the first network password is generated by applying a hash function to the converged network password, and the second network password is generated by truncating the first network password.

5. The system of claim 1, wherein the one of the network interfaces is the first one of the network interfaces, and the network security parameter management logic is further configured to connect to the converged data communications network by pairing the second one of the network interfaces using another native paring protocol of the second one of the heterogeneous link layer technologies based at least in part on the converged network password.

6. The system of claim 1, wherein the one of the network interfaces is the first one of the network interfaces, and the network security parameter management logic is further configured to:
   obtain, by way of the first one of the network interfaces, a network security parameter for pairing the second one of the network interfaces; and
   connect to the converged data communications network by pairing the second one of the network interfaces based at least in part on the network security parameter.

7. The system of claim 1, wherein the at least one of the network devices further includes an abstraction layer configured to:
   obtain a first data frame and a second data frame from a network layer;
   route the first data frame to a destination by way of the first one of the network interfaces; and
   route the second data frame to the destination by way of the second one of the network interfaces.

8. The system of claim 7, wherein a media access control (MAC) address is allocated to the abstraction layer, and the MAC address is unique within the converged data communications network.

9. The system of claim 1, wherein the at least one of the network devices further includes network security parameter distribution logic configured to:
   obtain a request for a network security parameter, the request originating in another one of the network devices;
   determine whether the network security parameter is associated with at least one of the network interfaces;
   send the network security parameter to the other one of the network devices by way of the converged data communications network when the network security parameter is associated with the at least one of the network interfaces; and
   propagate the request in the converged data communications network away from the other one of the network devices when the network security parameter is not associated with the at least one of the network interfaces.

10. A system, comprising:
    a plurality of network devices in data communication by way of a converged data communications network employing a plurality of heterogeneous link layer technologies; and
    a gateway device, corresponding to a first one of the network devices, the gateway device comprising network security parameter distribution logic that is configured to:
       obtain a network security parameter for each of a plurality of network portions of the converged data communications network, a first one of the network portions employing a first one of the heterogeneous link layer technologies, a second one of the network portions employing a second one of the heterogeneous link layer technologies, each of the network security parameters facilitating an authenticated connection to a corresponding one of the network portions;
       obtain a request for at least one of the network security parameters originating from a second one of the network devices; and
       provide the at least one of the network security parameters to the second one of the network devices by way of the converged data communications network.

11. The system of claim 10, wherein the gateway device further comprises logic that maintains a topology of the network devices connected to the converged data communications network.

12. The system of claim 10, wherein the gateway device is configured to route data from the converged data communications network to another network.

13. The system of claim 10, wherein the request is obtained from a third one of the network devices, and the at least one of the network security parameters is provided to the second one of the network devices by way of the third one of the network devices.

14. The system of claim 10, wherein at least one of the network devices corresponds to a relay network device having a plurality of first network interfaces, at least one of the network devices corresponds to a terminal network device having a plurality of second network interfaces, the relay network device is configured to relay management frames and data frames between the first network interfaces, and the terminal network device is configured to relay management frames but not data frames between the second network interfaces.

15. A method, comprising:
    generating, in a first one of a plurality of network devices, a pairing event;
    distributing, in the first one of the network devices, the pairing event to a converged data communications network by way of a first one of a plurality of heterogeneous link layer technologies;
    obtaining, in a second one of a plurality of network devices, the pairing event by way of the converged data communications network;
    initiating, in the second one of the network devices, a pairing with a third one of the network devices by way of a second one of the heterogeneous link layer technologies using a native pairing event protocol of the second one of the heterogeneous link layer technologies; and
    wherein the pairing is configured to connect the third one of the network devices to the converged data communications network by way of the second one of the heterogeneous link layer technologies.

16. The method of claim 15, wherein the pairing event corresponds to a push button event, and the push button event is generated in the first one of the network devices in response to a user pushing a button of the first one of the network devices.

17. The method of claim 15, further comprising requesting, in the third one of the network devices, a network security parameter over the converged data communications network for pairing the third one of the network devices with a fourth one of the network devices.

18. The method of claim 15, further comprising:
    generating, in the third one of the network devices, another pairing event;
    sending, in the third one of the network devices, the other pairing event to the second one of the network devices by way of the second one of the heterogeneous link layer technologies; and
    wherein the second one of the network devices is configured to perform the step of initiating the pairing in response to obtaining the pairing event and the other pairing event within a predefined length of time.

19. The method of claim 15, further comprising:
    obtaining, in a fourth one of a plurality of network devices, the pairing event by way of the converged data communications network;
    initiating, in the fourth one of the network devices, another pairing with the third one of the network devices by way of a third one of the heterogeneous link layer technologies using a native pairing event protocol of the third one of the heterogeneous link layer technologies; and
    wherein the other pairing is configured to connect the third one of the network devices to the converged data communications network by way of the third one of the heterogeneous link layer technologies.

20. The method of claim 15, further comprising:
    initiating, in the second one of the network devices, another pairing with the third one of the network devices by way of a third one of the heterogeneous link layer technologies using a native pairing event protocol of the third one of the heterogeneous link layer technologies; and
    wherein the other pairing is configured to connect the third one of the network devices to the converged data communications network by way of the third one of the heterogeneous link layer technologies.

* * * * *